United States Patent
Martin et al.

(10) Patent No.: US 9,558,408 B2
(45) Date of Patent: Jan. 31, 2017

(54) TRAFFIC SIGNAL PREDICTION

(71) Applicant: Ford Global Technologies, LLC, Dearborn, MI (US)

(72) Inventors: Douglas R. Martin, Canton, MI (US); Kenneth J. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 523 days.

(21) Appl. No.: 14/053,868

(22) Filed: Oct. 15, 2013

(65) Prior Publication Data
US 2015/0104071 A1    Apr. 16, 2015

(51) Int. Cl.
*G06K 9/00* (2006.01)
*G08G 1/01* (2006.01)
*G08G 1/017* (2006.01)
*G08G 1/04* (2006.01)
*G08G 1/0967* (2006.01)
*G08G 1/0968* (2006.01)
*G08G 1/00* (2006.01)

(52) U.S. Cl.
CPC ....... *G06K 9/00791* (2013.01); *G06K 9/00651* (2013.01); *G08G 1/012* (2013.01); *G08G 1/0129* (2013.01); *G08G 1/0133* (2013.01); *G08G 1/0141* (2013.01); *G08G 1/0145* (2013.01); *G08G 1/0175* (2013.01); *G08G 1/04* (2013.01); *G08G 1/096716* (2013.01); *G08G 1/096725* (2013.01); *G08G 1/096741* (2013.01); *G08G 1/096775* (2013.01); *G08G 1/096811* (2013.01); *G08G 1/096844* (2013.01); *G08G 1/202* (2013.01); *G08G 1/205* (2013.01)

(58) Field of Classification Search
CPC .... G08G 1/012; G08G 1/0129; G08G 1/0133; G08G 1/0141
See application file for complete search history.

(56) References Cited

U.S. PATENT DOCUMENTS

| 4,370,718 | A  | * | 1/1983 | Chasek | G08G 1/08 340/911 |
| 6,343,247 | B2 | * | 1/2002 | Jitsukata | 180/168 |
| 6,424,408 | B1 | * | 7/2002 | Ooga | G01P 5/26 342/36 |
| 7,327,280 | B2 | * | 2/2008 | Bachelder | F41G 9/00 340/902 |

(Continued)

FOREIGN PATENT DOCUMENTS

WO    WO 96/28343    9/1996

OTHER PUBLICATIONS

Rosenbaum et al, "Real-Time Image Processing for Road Traffic Data Extraction From Aerial Images"; ISPRS TC VII Symposium—100 Years ISPRS, Vienna, Austria, Jul. 5-7, 2010, IAPRS, vol. XXXVIII, Part 7B, pp. 1-6.*

(Continued)

*Primary Examiner* — Chan Park
*Assistant Examiner* — Mia M Thomas
(74) *Attorney, Agent, or Firm* — Frank MacKenzie; Bejin Bieneman PLC (57) ABSTRACT

An aerial image relates to a geographic area. The aerial image is analyzed to identify at least one traffic signal in the geographic area. Based at least in part on analyzing the aerial image, a timing prediction is determined for the at least one traffic signal.

20 Claims, 4 Drawing Sheets

(56) References Cited

U.S. PATENT DOCUMENTS

| | | | |
|---|---|---|---|
| 7,646,311 B2* | 1/2010 | Afzulpurkar | G06K 9/00785 340/435 |
| 7,762,495 B2 | 7/2010 | Miller | |
| 7,792,622 B2 | 9/2010 | Wei et al. | |
| 7,899,213 B2* | 3/2011 | Otsuka | B60Q 1/1423 348/113 |
| 8,320,616 B2 | 11/2012 | Kaiser et al. | |
| 8,509,488 B1 | 8/2013 | Enge et al. | |
| 8,634,653 B1 | 1/2014 | Castelaz | |
| 9,349,288 B2* | 5/2016 | Raamot | G08G 1/08 |
| 2003/0098801 A1* | 5/2003 | Martin | G08G 1/0965 340/902 |
| 2004/0239688 A1 | 12/2004 | Krajec | |
| 2005/0031169 A1 | 2/2005 | Shulman et al. | |
| 2005/0122235 A1* | 6/2005 | Teffer | G08G 1/01 340/937 |
| 2005/0219041 A1* | 10/2005 | Dobler | B60Q 9/008 340/425.5 |
| 2005/0267657 A1 | 12/2005 | Devdhar | |
| 2006/0238379 A1* | 10/2006 | Kimchi | G01C 21/26 340/995.1 |
| 2006/0238383 A1* | 10/2006 | Kimchi | G01C 21/26 340/995.1 |
| 2006/0253254 A1* | 11/2006 | Herwitz | G01S 13/86 701/301 |
| 2006/0269104 A1* | 11/2006 | Ciolli | G08G 1/052 382/104 |
| 2007/0047809 A1* | 3/2007 | Sasaki | G06K 9/00791 382/170 |
| 2007/0061076 A1 | 3/2007 | Shulman | |
| 2007/0176791 A1* | 8/2007 | Bolotin | G08G 1/096 340/929 |
| 2007/0210937 A1* | 9/2007 | Smith | G08G 1/0962 340/995.1 |
| 2007/0250260 A1* | 10/2007 | Ariyur | G01S 3/7864 701/519 |
| 2007/0263902 A1* | 11/2007 | Higuchi | G05D 1/0246 382/104 |
| 2008/0009965 A1* | 1/2008 | Bruemmer | G06N 3/008 700/245 |
| 2008/0015775 A1 | 1/2008 | Guo et al. | |
| 2008/0030372 A1* | 2/2008 | Lu | G08G 1/096 340/929 |
| 2008/0059055 A1* | 3/2008 | Geelen | G01C 21/32 701/533 |
| 2008/0065267 A1* | 3/2008 | Hong | B25J 9/0003 700/245 |
| 2008/0205705 A1* | 8/2008 | Kashimura | B60Q 1/1423 382/104 |
| 2009/0005984 A1* | 1/2009 | Bradley | G01C 21/20 701/469 |
| 2009/0043504 A1* | 2/2009 | Bandyopadhyay | G01C 17/38 701/469 |
| 2009/0055020 A1* | 2/2009 | Jeong | G05D 1/0246 700/251 |
| 2009/0273486 A1* | 11/2009 | Sitbon | G08G 1/095 340/907 |
| 2009/0303077 A1* | 12/2009 | Onome | G08G 1/096716 340/901 |
| 2009/0306881 A1* | 12/2009 | Dolgov | G05D 1/0246 701/28 |
| 2010/0074555 A1* | 3/2010 | Diaz | G06K 9/00637 382/284 |
| 2010/0100268 A1* | 4/2010 | Zhang | B60W 30/09 701/25 |
| 2010/0123778 A1* | 5/2010 | Hada | B60R 1/00 348/148 |
| 2010/0171640 A1* | 7/2010 | Delia | G08G 1/07 340/907 |
| 2010/0256863 A1* | 10/2010 | Nielsen | G07C 5/085 701/31.4 |
| 2011/0007150 A1 | 1/2011 | Johnson et al. | |
| 2011/0064276 A1* | 3/2011 | Tanaka | H04N 19/186 382/107 |
| 2011/0135155 A1* | 6/2011 | Kudo | G06K 9/2054 382/104 |
| 2011/0144859 A1* | 6/2011 | Suk | B60W 30/12 701/33.4 |
| 2011/0166705 A1 | 7/2011 | Anderson et al. | |
| 2011/0182473 A1* | 7/2011 | Wang | G08G 1/04 382/103 |
| 2011/0182475 A1* | 7/2011 | Fairfield | G05D 1/0212 382/104 |
| 2011/0191011 A1* | 8/2011 | McBride | H04L 41/0823 701/117 |
| 2012/0059720 A1 | 3/2012 | Musabji et al. | |
| 2012/0087546 A1* | 4/2012 | Focke | B60R 1/00 382/104 |
| 2012/0101679 A1* | 4/2012 | Anderson | B25J 9/1671 701/23 |
| 2012/0194357 A1* | 8/2012 | Ciolli | G08G 1/052 340/936 |
| 2012/0288138 A1* | 11/2012 | Zeng | G08G 1/09626 382/103 |
| 2012/0303278 A1* | 11/2012 | Dannevik | G01W 1/10 702/3 |
| 2013/0022245 A1* | 1/2013 | Sivertsen | G08G 1/07 382/104 |
| 2013/0100286 A1* | 4/2013 | Lao | G06K 9/00785 348/148 |
| 2013/0121536 A1* | 5/2013 | Huang | G06K 9/00785 382/104 |
| 2013/0191022 A1 | 7/2013 | Mathes et al. | |
| 2013/0253754 A1* | 9/2013 | Ferguson | G05D 1/0231 701/28 |
| 2013/0287261 A1* | 10/2013 | Lee | G08G 1/0145 382/104 |
| 2013/0307979 A1 | 11/2013 | Chen et al. | |
| 2014/0071286 A1* | 3/2014 | Bernal | G06T 7/20 348/149 |
| 2014/0111647 A1 | 4/2014 | Atsmon et al. | |
| 2014/0112537 A1* | 4/2014 | Frank | H04N 5/33 382/103 |
| 2014/0147008 A1 | 5/2014 | Aoki et al. | |
| 2014/0172290 A1 | 6/2014 | Prokhorov et al. | |
| 2014/0176321 A1* | 6/2014 | Chen | B60W 30/14 340/435 |
| 2014/0244078 A1* | 8/2014 | Downey | G05D 1/0055 701/11 |
| 2014/0257595 A1 | 9/2014 | Tillmann | |
| 2014/0257621 A1 | 9/2014 | Zych | |
| 2014/0358427 A1 | 12/2014 | Fuhrman | |
| 2015/0073705 A1 | 3/2015 | Hiwatashi | |
| 2015/0105933 A1* | 4/2015 | Martin | G07C 5/0866 701/1 |
| 2015/0127208 A1 | 5/2015 | Jecker et al. | |
| 2015/0262483 A1* | 9/2015 | Sugawara | G08G 1/0962 340/929 |
| 2015/0291093 A1* | 10/2015 | Iwai | G08G 1/166 340/995.27 |
| 2016/0054138 A1* | 2/2016 | Kojo | G06T 7/60 701/423 |
| 2016/0267790 A1* | 9/2016 | Raamot | G08G 1/08 |

OTHER PUBLICATIONS

Fairfield et al. "Traffic Light Mapping and Detection" 2011 IEEE International Conference on Robotics and Automation Shanghai International Conference Center May 9-13, 2011, Shanghai, China, pp. 1-6.*

Day et al. "SCOOT—Split, Cycle, & Offset Optimization Techniques", Transportation Research Board, TRB Committee A3A18 Traffic Signal Systems TRB Mid-Year Meeting and Adaptive Traffic Signal Control Workshop, Jul. 12-14, 1998.*

Meyer et al., "Design Considerations for Long Endurance Unmanned Aerial Vehicles", Thanh Mung Lam (Ed.), ISBN: 978-953-7619-41-1, InTech, Available from: http://www.intechopen.

(56) References Cited

OTHER PUBLICATIONS com/books/aerial_vehicles/design_considerations_for_long_endurance_unmanned_aerial_vehicles (Jan. 2009).

Pippin et al., "The Design of an Air-Ground Research Platform for Cooperative Surveillance", GTRI Technical Report CUSTD_GTRL_TECHREPORT_112010.

Puri, "A Survey of Unmanned Aerial Vehicles (UAV) for Traffic Surveillance", Department of Computer Science and Engineering.

USPTO Office Action dated Mar. 27, 2015, U.S. Appl. No. 14/053,853, filed Oct. 15, 2013, 18 pages.

USPTO Office Action dated Feb. 3, 2015, U.S. Appl. No. 14/053,859, filed Oct. 15, 2013, 17 pages.

USPTO Non-Final Office Action dated Jul. 10, 2015, U.S. Appl. No. 14/053,859, filed Oct. 15, 2013, 22 pages.

\* cited by examiner

TRAFFIC SIGNAL PREDICTION

CROSS-REFERENCE TO RELATED APPLICATIONS

This application is related to U.S. patent application Ser. No. 14/053,853, filed Oct. 15, 2013 now U.S. Pat. No. 9,175,966, entitled "Remote Vehicle Monitoring" and U.S. patent application Ser. No. 14/053,859, filed Oct. 15, 2013 entitled "Aerial Data For Vehicle Navigation", the complete contents of which are hereby incorporated herein by reference in their entirety.

BACKGROUND

Existing mechanisms for tracking and guiding vehicles lack sufficient reliability for use in certain real-world systems. For example, vehicle GPS (global positioning system) coordinates may not always be available, or may be intermittently available. Further, GPS coordinates do not provide context concerning a vehicle location or operation, such as information about surrounding roads, landmarks, traffic conditions, driver behavior, etc. Accordingly improvements are needed in the area of vehicle location and tracking. For example, better mechanisms are needed tracking vehicles that are stolen, driven by inexperienced drivers, being used for livery, etc. Further, mechanisms are needed for autonomous, semi-autonomous, and other visual/radar sensory safety systems. Mechanisms are also lacking for determining traffic light timing, and for guiding vehicles to minimize braking and improve fuel economy.

DETAILED DESCRIPTION

System Overview

Figure 1:
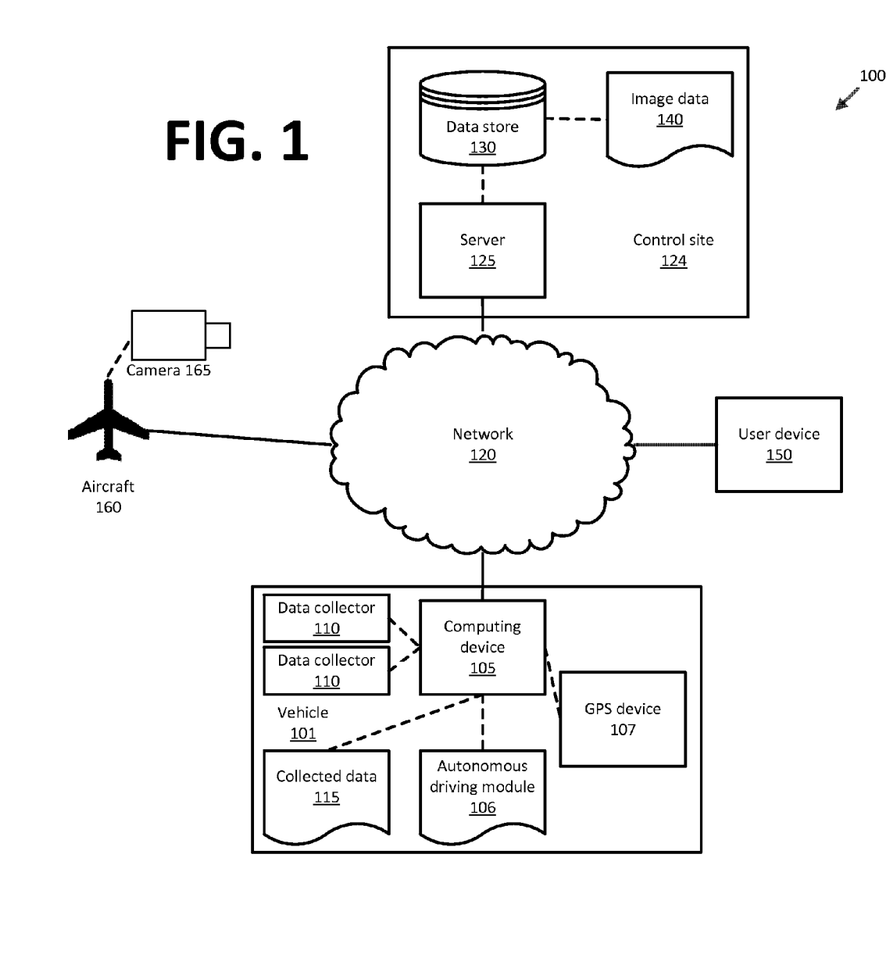
FIG. 1 is a block diagram of an exemplary remote vehicle monitoring system.

FIG. 1 is a block diagram of an exemplary remote vehicle monitoring system 100. A computer 105 in a vehicle 101 may be configured for communicating with one or more remote sites including a server 125 via a network 120, such remote site possibly including a data store 130. A vehicle 101 includes the vehicle computer 105 that is configured to receive information, e.g., collected data 115, from a GPS device 107 and/one or more data collectors 110. The computer 105 generally includes an autonomous driving module 106 that comprises instructions for autonomously, i.e., without operator input, operating the vehicle 101, generally using information from the data collectors 110, and including possibly in response to instructions received from a server 125 at a control site 124.

A data store 130 included in or communicatively coupled to a server 125 at the control site 124 may include image data 140, e.g., a high-resolution aerial image of a geographic area, obtained from a camera or cameras 165 carried by one or more aircraft 160. The server 125 generally processes the image data 140 in conjunction with collected data 115 to provide information related to one or more vehicles 101. For example, the server 125 may determine identifying information for a vehicle 101, e.g., GPS coordinates for a vehicle 101 from collected data 115 for that vehicle 101, visual identifying information for the vehicle 101 communicated from the computer 105 and/or stored in the server 125 in association with an identifier for the vehicle 101, such as letters, numbers, symbols, etc., affixed to the top of a vehicle, 101. The server 125 may then locate a portion of image data 140 that includes an image of the vehicle 101.

Accordingly, an image of a vehicle 101 and/or its surroundings may be provided to a user device 150 and/or the computer 105. Thus, the system 100 may provide useful information concerning the vehicle 101 in a variety of contexts, e.g., tracking or locating a stolen vehicle 101, a vehicle 101 being operated by a minor driver, locating a taxicab or the like, viewing some or all of a route being traversed or anticipated to be traversed by the vehicle 101 to determine traffic conditions, road conditions, e.g., relating to construction, accidents, etc. Further in this vein, the system 100 may provide information useful to vehicle 101 navigation, e.g., where a road hazard is detected that poses a safety threat or navigational obstacle, where the vehicle 101 needs to navigate in an area, such as a parking lot, that includes unmapped obstacles, etc.

Exemplary System Elements

Vehicle

The system 100 may provide information relating to a vehicle 101, e.g., an automobile, truck, watercraft, aircraft, etc., and generally may provide information relating to many vehicles 101. As illustrated in FIG. 1, a vehicle 101 includes a vehicle computer 105 that generally includes a processor and a memory, the memory including one or more forms of computer-readable media, and storing instructions executable by the processor for performing various operations, including as disclosed herein. Further, the computer 105 may include or be communicatively coupled to more than one computing device, e.g., controllers or the like included in the vehicle 101 for monitoring and/or controlling various vehicle components, e.g., an engine control unit (ECU), transmission control unit (TCU), etc. Note that, although one vehicle 101 is shown in FIG. 1 for ease of illustration, the system 100 could service, and is intended to service, multiple vehicles 101, possibly thousands, tens of thousands, or more.

The computer 105 and such other computing devices in the vehicle 101 are generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, operation of components such as lights, windshield wipers, etc. Further, the module 106 may include instructions for evaluating and conducting autonomous operations according to information received in the computer 105, e.g., from the GPS device 107 and/or data collectors 110.

The GPS (global positioning system) device 107 is known for communicating with GPS satellites and determining a location, e.g., according to geo-coordinates that specify a latitude and longitude, of a vehicle 101. The GPS device 107 may be used in the vehicle 101 to provide a location, e.g., with reference to a map displayed by the GPS device 107 and/or computing device 105. Further, the GPS device 107 may communicate a vehicle 101 location, e.g., geo-coordinates for the vehicle 101, to the server 125, e.g., via the network 120 and/or the computing device 105.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. Yet other sensor data collectors 110 could include cameras, breathalyzers, motion detectors, etc., i.e., data collectors 110 to provide data for providing information concerning a vehicle 101 operator and/or occupant.

A memory of the computer 105 generally stores collected data 115. Collected data 115 may include a variety of data collected in a vehicle 101, including location information such as geo-coordinates obtained via the GPS device 107. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. Accordingly, collected data 115 could include a variety of data related to vehicle 101 operations and/or performance, as well as data related to environmental conditions, road conditions, etc. relating to the vehicle 101. As discussed further above and below, certain collected data 115, e.g., GPS coordinates, are generally provided to the server 125, generally in association with a unique or substantially unique identifier for the vehicle 101 providing the collected data 115.

Network

The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

Control Site

Although one control site 124 is shown in FIG. 1 for ease of illustration, multiple control sites 124, and multiple servers 125, are possible, even likely, in the context of the system 100. For example, in a given geographic area, a first control site 124 may be dedicated to providing information and/or instructions to modules 106 in vehicle 101 computers 105 to direct autonomous vehicle operations. A second control site 124 may be dedicated to obtaining, analyzing, and disseminating image data 140. Additionally or alternatively, multiple control sites 124 in a geographic area may provide for redundancy, extra capacity, etc.

A control site 124 may include one or more computer servers 125, each server 125 generally including at least one processor and at least one memory, the memory storing instructions executable by the processor, including instructions for carrying out various steps and processes described herein. The server 125 may include or be communicatively coupled to a data store 130 for storing collected data 115 and/or image data 140. For example, collected data 115 relating to GPS coordinates of a vehicle 101 over various times could be stored in the data store 120. The server 125 may include or be communicatively coupled to a radio frequency (RF) device for communication with the aircraft 160. Image data 140 provided by the camera 165 via an RF link or some other mechanism, e.g., via the network 120, could be stored in the data store 130, as could portions thereof after being analyzed and/or processed by the server 125.

User Device

A user device 150 may be any one of a variety of computing devices including a processor and a memory, as well as communication capabilities. For example, the user device 150 may be a mobile or portable computer, tablet computer, a smart phone, etc. that includes capabilities for wireless communications using IEEE 802.11, Bluetooth, and/or cellular communications protocols. Further, the user device 150 may use such communication capabilities to communicate via the network 120, e.g., with the server 125. For example, a user device 150 may be able to access a user account or the like stored on the server 125 and/or access the server 125 to access image data 140, including portions of image data 140 received from a camera 165 that the server 125 has analyzed and/or processed as described further herein below.

A user device 150 may further communicate, e.g., via the network 120 and/or directly, with a vehicle computer 105, e.g., using Bluetooth. Accordingly, a user device 150 may be used to carry out certain operations herein ascribed to a data collector 110, e.g., global positioning system (GPS) functions, etc., and a user device 150 could be used to provide data 115 to the computer 105. Further, a user device 150 could be used to provide a human machine interface (HMI) to the computer 105.

Aircraft

The aircraft 160 may be an autonomous airplane or the like, e.g., a "drone" such as is known, and as may be capable at flying at high altitudes, e.g., 33,000 feet or above, for significant periods of time, e.g., weeks or months. The aircraft 160 may be operated and controlled in a known manner, e.g., from the site 124. Accordingly, the aircraft 160, possibly in conjunction with one or more other aircraft 160 (only one aircraft 160 being shown in FIG. 1 for ease of illustration) may provide image data 140 relating to a specified geographic area to one or more remote sites 124. As mentioned above, a dedicated RF link may be provided between an aircraft 160 and a site 124. Accordingly, the aircraft 160 may include a computing device or the like for receiving image data 140 from a camera 165, and for providing such image data 140 to a server 125 in a control site 124.

The aircraft 160 generally carries one or more cameras 165 for capturing image data 140. For example, a camera 165 may a device such as is known for capturing still and/or moving high-resolution images of ground and objects on the ground below the aircraft 160. Further, the camera 165 could incorporate various known technologies for accommodating other than clear conditions, e.g., darkness, clouds, etc. For example, the camera 165 could utilize synthetic aperture radar (SAR), infrared imaging, etc. to compensate for clouds, darkness, etc.

Exemplary Process Flows

Figure 2:
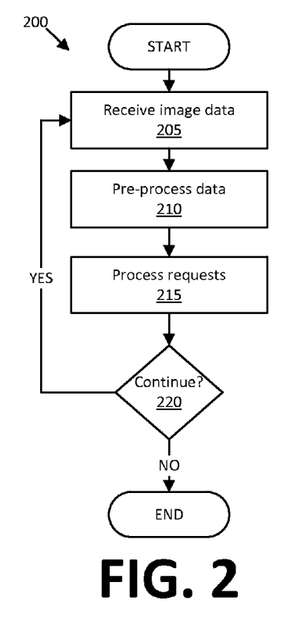
FIG. 2 is a diagram of an exemplary process for remote vehicle monitoring.

FIG. 2 is a diagram of an exemplary process 200 for remote vehicle 101 monitoring. Note that, although a vehicle 101 is described above as being an autonomous vehicle, the system 100 could include vehicles 101 that do not include components for operating autonomously, e.g., the autonomous driving module 106, data collectors 110 used to provide information for autonomous operations, etc. Moreover, a vehicle 101, even if configured for autonomous operations, may not be operated autonomously in the context of the system 100.

The process 200 begins in a block 205, in which a server 125 receives image data 140 from an aircraft 160. As mentioned above, a dedicated RF link may exist between a remote site 124 and an aircraft 160 for communications including transmission of image data 140 and/or information relating to conditions, operation, etc. of the aircraft 160.

Next, in a block 210, the server 125 may store the image data 140 in the data store 130 and/or perform pre-processing, e.g., processing of the image data 140 performed prior to receiving any user requests relating to the image data 140. For example, the server 125 could divide an image of a geographic area into smaller images, could blow up or otherwise amplify an image or characteristics in an image, could map coordinates in an image or images to geo-coordinates, etc. In general, the server 125 applies a geographic coordinate system to the aerial image data 140 obtained from the aircraft 160 thereby facilitate location of a vehicle 101 according to geo-coordinates provided by the vehicle 101 and/or according to indicia affixed to the vehicle 101.

Next, in a block 215, the server 125 may process requests for image data 140, e.g., received from one or more user devices 150 pertaining to one or more vehicles 101. Processing of requests is described in more detail below concerning the process 300 of FIG. 3.

Following the block 215, in a block 220, the server 125 determines whether to continue the process 200. In general, the process 200 executes continuously or substantially continuously on a server or cluster of servers 125. Further, it should be understood that the blocks 205, 210, 215, discussed above, may be executed simultaneously or substantially simultaneously with respect to different image data 140 and/or requests for image data 140. Of course, the process 200 will not execute infinitely. For example, the server 125 may be powered off or taken off-line for maintenance, etc. In any case, the process 200 returns to the block 205 to continue, but otherwise ends.

Figure 3:
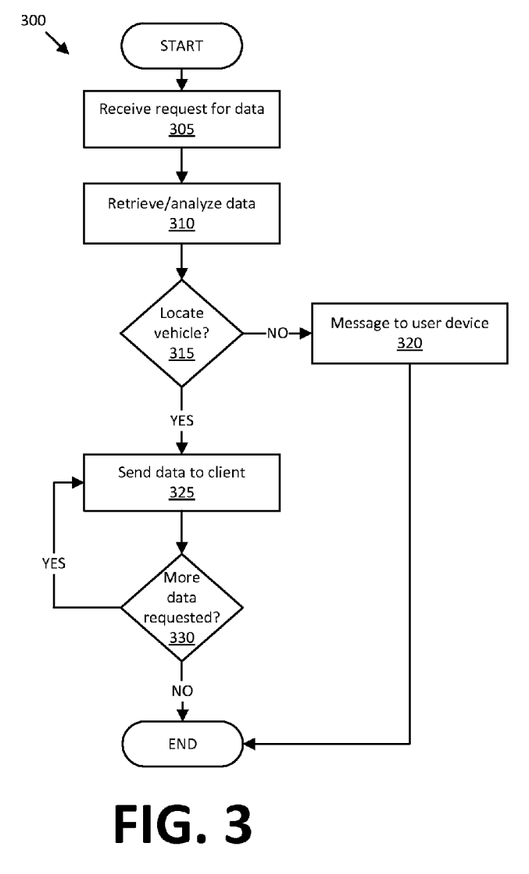
FIG. 3 is a diagram of an exemplary process for providing data from remote vehicle monitoring.

FIG. 3 is a diagram of an exemplary process 300 for providing data from remote vehicle monitoring.

The process 300 begins in a block 305, prior to which, for purposes of the process 300, it should be understood that the server 125 receives and/or pre-processes image data 140 as described above with respect to the blocks 205, 210 of process 200. In the block 305, the server 125 determines whether it has received a request, e.g., from a user device 150 for data relating to a vehicle 101. As mentioned above, a user device 150 may access the server 125 according to a user account or the like. For example, a user may have a subscription or the like to receive image data 140 relating to a vehicle 101 or vehicles 101. Accordingly, a request for image data 140 may specify a user account and/or user identifier associated with the request and/or an identifier for a vehicle 101, e.g., a vehicle identification number (VIN), for which image data 140 is requested. A request may also specify a type of image data 140 requested, e.g., a still image, a moving image, etc. Further, a request may specify other requested data, e.g., overlay of map information on an image, such as street names, landmark names, natural features such as rivers, governmental boundaries, etc.

A request may also include a timestamp and/or additional indication concerning a period of time for which data is requested concerning a vehicle 101. For example, if a vehicle 101 is involved in an incident such as a collision with another vehicle or other traffic accident, the vehicle 101 could send a message to the server 125 indicating that the vehicle 101 has been involved in an incident. Then, in locating and providing requested data as described further below with respect to the process 300, the server 125 could include data in a time window surrounding a timestamp associated with the incident, e.g., plus/minus one minute, etc.

If a request is received in the block 310, the process 300 returns to the block 305. However, if such a request has been received, the process 300 proceeds to a block 315.

Next, in a block 310, the server 125 retrieves image data 140 relevant to the request received in the block 305, and attempts to locate a vehicle 101 specified in the request. For example, the server 125 may have received, from a vehicle 101 that is a subject of the request, collected data 115 including geo-coordinates or the like indicating the vehicle 101 location. Accordingly, the server 125 may identify a portion of image data 140 showing the location of the vehicle 101, and may even highlight or otherwise provide an indication of a location of a vehicle 101 image, e.g., by a circle around the location, and arrow pointing to it, etc., overlaid on the portion of the image data 140. Alternatively or additionally, a vehicle 101 may have affixed to thereto, e.g., on a roof of the vehicle 101, identifying indicia, e.g., letters, numbers, symbols, etc., e.g., in a manner presently used for law enforcement vehicles. The server 125 could use image processing techniques to recognize such identifying indicia and to thereby retrieve an appropriate portion of image data 140 and/or highlight an image and/or location of the vehicle 101.

In addition, where indicated by a request, e.g., a request for data surrounding a traffic accident or the like as described above, the server 125 may retrieve image data 140, e.g., a video stream and/or a series of still images, for a time window associated with the request. Such image data 140 may be helpful to insurance companies, law enforcement personnel, etc., evaluating an incident involving the vehicle 101.

Further in the block 310, the server 125 may provide analysis of the image data 140 pertinent to the vehicle 101. For example, image recognition techniques could be used to identify traffic conditions, road construction, etc., relevant to the vehicle 101. For instance, image recognition techniques could be used to identify traffic congestion and/or road construction in an image 140 so that a vehicle 101 could be warned of potential disruption or slowness of a planned route. Likewise, image analysis techniques could be used to identify an event involving one or more specified vehicles 101, e.g., a crash event, a traffic violation, etc.

Following the block 310, in a block 315, the server 125 determines whether the vehicle 101 indicated in the request of the block 305 was located in the block 310. Alternatively or additionally, the server 125 could determine whether an event, e.g., a crash event, could be located. In any case, if image data 140 can be identified for a request received in the block 305, then a block 325 is executed next. Otherwise, a block 320 is executed next.

In a block 320, the server 125 provides a message to the user device 150 that made the request of the blocking 305 to indicate that the vehicle 101 that was the subject of the request could not be located. Then the process 300 ends.

In a block 325, which may follow the block 315 above, the server 125 sends a selection of image data 140, determined as described above with respect to the block 315, to a user device 150 in response to the request received in the block 310. Generally, but not necessarily, the user device 150 receiving image data 140 in the block 315 is a same user device 150 that requested the image data 140 in the block 310. The user device 150 may display the image data 140. Further, the user device 150 may display multiple images 140, e.g., images 140 relating to different respective vehicles 101. For example, a user device 140 could provide a multi-screen or split display featuring multiple, e.g., even tens, thousands, or more, vehicles 101, e.g., if the user device received images 140 for sixteen different vehicles 101, the images 140 could be shown in a four-by-four grid with each vehicle 101 identified by a number, a user name, etc., and moreover map data could be overload on the images 140 to show a location and/or geographic context for each vehicle 101.

Image data 140 provided to the user device 150, as noted above, may include a highlight or other indicator of a vehicle 101 location. Further, the image data 140 may include metadata, e.g., street names, location names, etc., overlaid on an image including the vehicle 101 so as to provide context and better indicate a location of the vehicle 101. In the case of moving image data 140, or a series of still images 140, overlaid mapped data could change as a vehicle 101 changed location. Similarly for example, image data 140 could be provided to a computer 105 in a vehicle 101, and overlaid on a map or navigational information being provided on a display of the computer 105. Moreover, response to a request that includes image data 140 could include other information, e.g., a likely time of arrival of a vehicle 101 at a specified location, alternate routes for the vehicle 101, etc.

Next, in a block 330, the server 125 determines whether it has received additional data that should be sent to the user device 150 in response to the request. For example, if the server 125 is providing moving image data 140 to the device 150, e.g., a stream of video data according to an MPEG (Motion Picture Experts Group) format or the like, the process 300 may return it to the block 325 to provide a further stream of video data 140. Likewise, if the server 125 is providing a series of still image data 140 to the device 150 the process 300 could return to the block 325 to provide further still image data 140. Further for example, a request could specify that updates or alerts are to be sent. For example, updated images 140 of a vehicle 101 could be provided periodically, e.g., every five minutes, every 10 minutes, etc. in response to a request. Likewise, alerts could be sent including an image 140 of a vehicle 101 when a vehicle 101 was in a location specified in the request, crossed the boundary specified in the request, was moving after or before a time specified in the request, etc.

If no further data 140 is to be sent to the user device, then the process 300 ends following the block 330.

Figure 4:
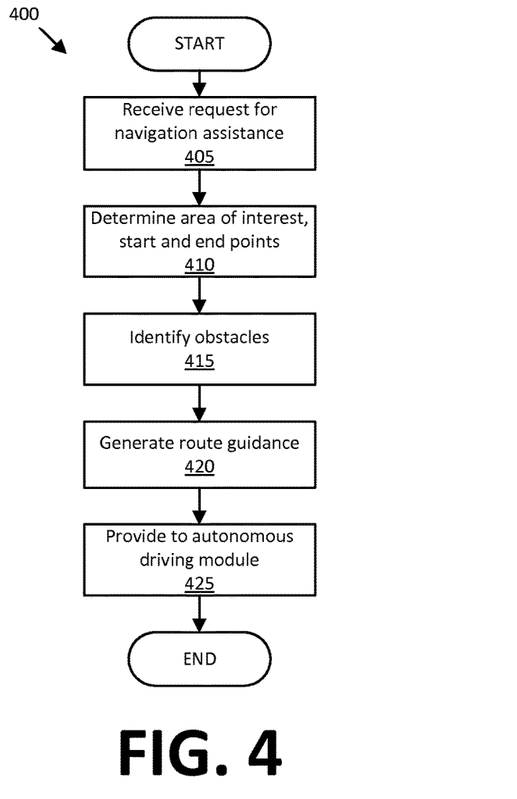
FIG. 4 is a diagram of a first exemplary process for using data from remote vehicle monitoring as input to autonomous vehicle operations.

FIG. 4 is a diagram of a first exemplary process 400 for using data from remote vehicle monitoring as input to autonomous vehicle operations.

The process 400 begins in a block 405, in which the server 125 receives a request for navigation assistance from a computer 105 in a vehicle 101. For example, an autonomous vehicle 101 could be attempting to navigate in an environment where a route cannot be determined by reference to a map, geo-coordinates, etc. One example of such an environment include a parking lot where cars, barriers, and the like present obstacles to navigating to a parking lot exit, where such obstacles are generally not represented on a map or determinable as landmarks with reference to geo-coordinates. Another example of environment where an autonomous vehicle 101 might need navigational assistance would be a situation where the vehicle 101 was adjacent to or surrounded by other objects around which the vehicle 101 needs to navigate to proceed with its route. For example, in a parking lot, an autonomous vehicle 101 could be surrounded by shopping carts or the like preventing the autonomous vehicle from proceeding in a desired direction.

In any event, the computer 105 in autonomous vehicle 101 could be configured to request additional navigational assistance from the server 125 when the autonomous vehicle 101 is unable to determine how to proceed. Such request for navigational assistance generally includes an identifier for the vehicle 101, geo-coordinates and/or an identification of indicia or markings on the vehicle 101, and the desired destination or point on a route of the vehicle 101 to which the computer 105 cannot determine a path.

Next, in a block 410, the server 125 determines an area of interest with respect to the autonomous vehicle 101 that provided the request of the block 405. For example, the server 125 could receive geo-coordinates or the like of the vehicle 101 and/or could locate the vehicle 101 using markings on the vehicle 101 such as discussed above. In any case, upon locating the vehicle 101, the server 125 could then use image recognition techniques to identify a type of environment in which the vehicle 101 is located, e.g., a parking lot, a city street, etc. Then the server 125 could determine an area of interest around the vehicle 101 according to a starting point, i.e., a present location of the vehicle 101 identified as described above, as well as a desired destination point, e.g., an end destination point, a point on a route of the vehicle 101, etc. That is, an area of interest around the vehicle 101 is generally defined to encompass the vehicle 101 and a radius around the vehicle 101 that includes the desired destination or end point.

Next, in a block 415, the server 125 analyzes image data 140 related to the area of interest determined in the block 410 to identify objects, e.g., fixed structures such as walls, berms, etc. and/or moveable objects such as shopping carts, bicycles, stationary or moving vehicles, etc. That is, the server 125 may use image recognition techniques to identify barriers or obstacles to progression of the vehicle 101. For example, a crowded parking lot may present a maze-like navigational problem. The server 125 may essentially identify rows of parked cars and/or barriers such as fences, walls, curbs, and the like as walls of the maze. Likewise, the server 125 may identify a shopping cart or the like abutting or proximate to the vehicle 101.

Next, in a block 420, the server 125 generates route guidance for the vehicle 101, e.g., instructions for the vehicle 101 to proceed from its present location to a desired end point. Accordingly, the server 125 may generate for the computer 105 a suggested route to the desired end point, e.g., point at which the parking lot exits onto a city street, navigational instructions, such as bumping the shopping cart slowly to progress past it, etc.

Next, in a block 425, the server 125 provides to the computer 105 in the vehicle 101 route guidance generated as described above with respect to the block 420. Alternatively or additionally, the server 125 could provide information generated described above with respect to the block 415 concerning the nature and/or location of barriers to vehicle 101 progression, and the computer 105 could use such information to generate a route to a desired destination point, e.g., parking lot exit. Further, the autonomous driving module 106 in the vehicle 101 could use information concerning obstacles, barriers, etc., in combination with collected data 115 from data collectors 110 in the vehicle 101 to generate a route to a desired destination point. For example, vehicle 101 sensors 110 could detect obstacles not apparent to the server 125 from image data 140, e.g., small potholes, speed-bumps that are the same color and texture as a parking lot or road surface, etc.

Following the block 425, the process 400 ends. Further following the block 425, an autonomous vehicle 101 may navigate according to a route and/or instructions generated as described above.

Figure 5:
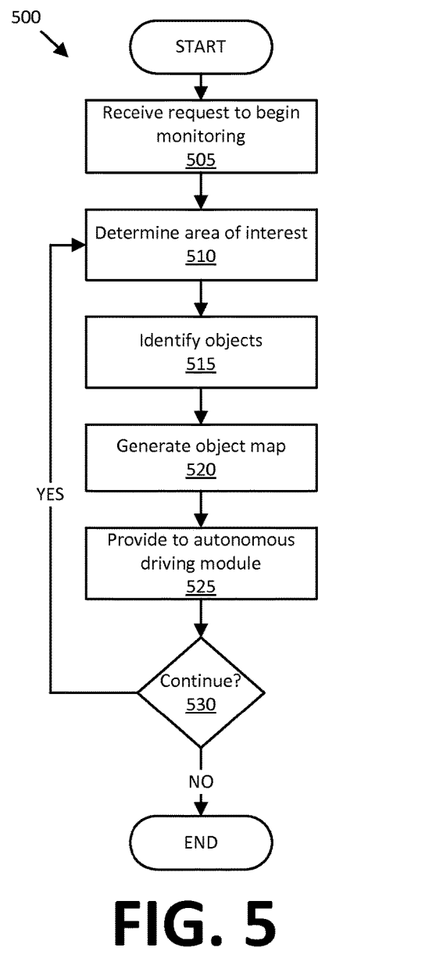
FIG. 5 is a diagram of a second exemplary process for using data from remote vehicle monitoring as input to autonomous vehicle operations.

FIG. 5 is a diagram of a second exemplary process 500 for using data from remote vehicle monitoring as input to autonomous vehicle operations.

The process 500 begins in a block 505, in which the server 125 receives a request for navigation assistance and/or monitoring from a computer 105 in a vehicle 101. For example, an autonomous vehicle 101 could automatically contact the server 125 to request monitoring as described with respect to this process 500 when autonomous driving operations begin. Alternatively, the autonomous driving module 106 could be configured to request monitoring from the server 125 when certain conditions arise, e.g., weather conditions such as wind, precipitation, etc., navigational difficulties such as the autonomous vehicle 101 encountering unexpected obstacles in a route, etc. In any event, in the block 605, the computer 105 in the vehicle 101 establishes contact with the server 125 to initiate monitoring with respect to the vehicle 101 and/or to receive monitoring information being generated by the server 125.

Next, in a block 510, the server 125 determines an area of interest with respect to the autonomous vehicle 101 that provided the request of the block 505. Such determination may be made in a manner similar to that of the block 410, discussed above. Alternatively or additionally, the server 125 could be used to provide monitoring for a particular geographic area, and to provide monitoring information as described with respect to this process 500 to any vehicle 101, or at least to any vehicle 101 subscribed to the system 100, in response to a request such as described with respect to the block 505. In this event, in the block 510, the server 125 could identify a geographic area being monitored relevant to the vehicle 101.

Next, in a block 515, the server 125 analyzes image data 140 related to the area of interest determined in the block 510 to identify objects of concern, e.g., obstacles such as rocks, potholes, stopped vehicles, blowing debris, blowing snow, construction barriers, etc. In general, image recognition techniques may be used to identify unexpected objects in a roadway. For example, vehicles such as cars and trucks may be expected in a roadway, along with, possibly construction equipment, construction barriers, lane dividers, etc. However, other objects may be unexpected and/or present safety and/or navigational hazards. Image analysis techniques may be used to identify and classify such other objects, e.g., providing an estimated size, weight, and possibly type (e.g., rocks, construction barriers, blowing debris, etc.

Next, in a block 520, the server 125 generates, for the area of interest, a map indicating respective locations of any objects of concern identified in the block 515. That is, the server 125 could identify geo-coordinates or the like for respective objects of concern so that a location of the respective objects of concern may be determined with respect to map data for the area of interest. In addition, the server 125 could associate risk assessments or action recommendations with the objects of concern. As mentioned above, image recognition techniques could be used to identify or classify specific objects of concern. In conjunction with such identification or classification, the server 125 could further assess a risk associated with the object of concern. For example, paper debris blowing across a roadway may have a low level of risk. Blowing snow may have a medium level of risk. A boulder in the roadway, or a stopped vehicle, may present a high level of risk. In addition, a boulder or a stopped vehicle could require action by the autonomous vehicle 101, e.g., to stop and/or navigate around the obstacle. Other objects, such as paper debris, may not require action by the autonomous vehicle 101.

The server 125 could also provide a confidence factor associated with each object. For example, analysis of an image 140 may identify an object with varying degrees of confidence that can be quantified, e.g., fifty percent confidence, seventy-five percent confident, ninety-nine percent confidence, that an object has been correctly identified.

Further, a visual map could be provided for display by the computer 105. For example, icons, stock images, or the like could be superimposed on image data 140 and/or a roadmap or the like of the area of interest. Further, in addition to reflecting a type of object or obstacle, a visual map could also include an icon or text indicating a type of risk associated with the object and/or a recommended action, e.g., low, medium, or high risk, and/or avoid object, proceed normally, etc.

In a block 525, which follows the block 520, the server 125 provides information to the vehicle 101 computer 105, e.g., the object map generated as described above with respect to the block 520. Alternatively or additionally, the server 125 could provide instructions based on the object map, e.g., for the autonomous module 106 to halt, turn, slow, speed up, etc. the vehicle 101 to safely avoid one or more identified objects. Such instructions are generally provided according to programming of the server 125, but could be provided according to input provided by a human operator analyzing the image 140 and/or an object identification, a risk assessment, and/or a confidence assessment by the server 125.

Further, the autonomous module 106 could include instructions for determining whether vehicle 101 data collectors 110 have independently identified an object included on the object map. In a case where the autonomous module 106 is not able to independently identify an object included on the object map, the autonomous module 106 could include instructions for following instructions from the server 125 with respect to the object, for taking action based on a risk level for an object, e.g., slow down or stop for high risk objects but proceed as normal for low-risk objects, etc.

The module 106 could alternatively or additionally take into account a confidence factor, mentioned above, provided by the server 125 and associated with an object. For example, if the server 125 indicates a ninety percent or above confidence that an object has been correctly identified, the module 106 may include instructions for generating an autonomous driving instruction related to the object. On the other hand, a low confidence in an object identification, e.g., below fifty percent, could result in the module 106 disregarding the object identification. Moreover, risk assessments and confidence assessments could be combined. For example, a high risk object might warrant action by the module 106 even with a relatively low confidence assessment, and vice-versa.

Further, as noted above, predictions of obstacles from image data 140 could be combined with and/or augmented by predictions of obstacles from collected data 115. For example, where the computer 105 may not establish a confidence level concerning the nature of an object from either of image data 140 or collected data 115 alone, a combination or comparison of predictions of an object's type, size, and/or location, etc. from these two sources could have a sufficient confidence level to provide a basis for navigating and/or autonomously operating the vehicle 101.

Further, where the autonomous module 106 is able to independently detect an object, the autonomous module 106 could include instructions for disregarding a risk assessment, confidence assessment, and/or recommended action from the server 125 related to the object. On the other hand, the autonomous module 106 could combine its own object identification with an object identification provided by the server 125. For example, the server 125 could indicate an object ahead of the vehicle 101 with a specified degree of confidence, e.g., sixty percent, and the vehicle 101 could likewise identify the object with a certain degree of confidence, e.g., fifty percent, whereupon the module 106 could then rely on the object identification with a great than fifty percent degree of confidence by incorporating the object identification and confidence assessment from the server 125. Moreover, the module 106 could use an object identification from the server 125 to confirm the identity of objects as they are encountered. For example, the server 125 could provide to the computer 106 information about an object that is a likely obstacle or hazard in the road ahead, e.g., "sharp turn ½ mile ahead," whereupon the module 106 could use this information to confirm its identification of the object, e.g., the sharp turn, as the vehicle 101 got nearer to the object. In general, operation of the autonomous module 106 can be enhanced by comparing object identification and the like from the server 125 with object identification and the like performed by the vehicle 101 computer 105.

Next, in a block 530, the server 125 determines whether the process 500 should continue. For example, the server 125 could be performing continuous or nearly continuous monitoring of one or more areas of interest related to one or more vehicles 101. However, a request received as described with respect to the block 505 could have been for a single object map and/or one-time monitoring. Further, the process 500 could end with respect to a vehicle 101 when a vehicle 101 is powered off, and autonomous module 106 ceases operation, etc. In any event, if the process 500 is to continue, control returns to the block 510. Otherwise, the process 500 ends following the block 530.

Figure 6:
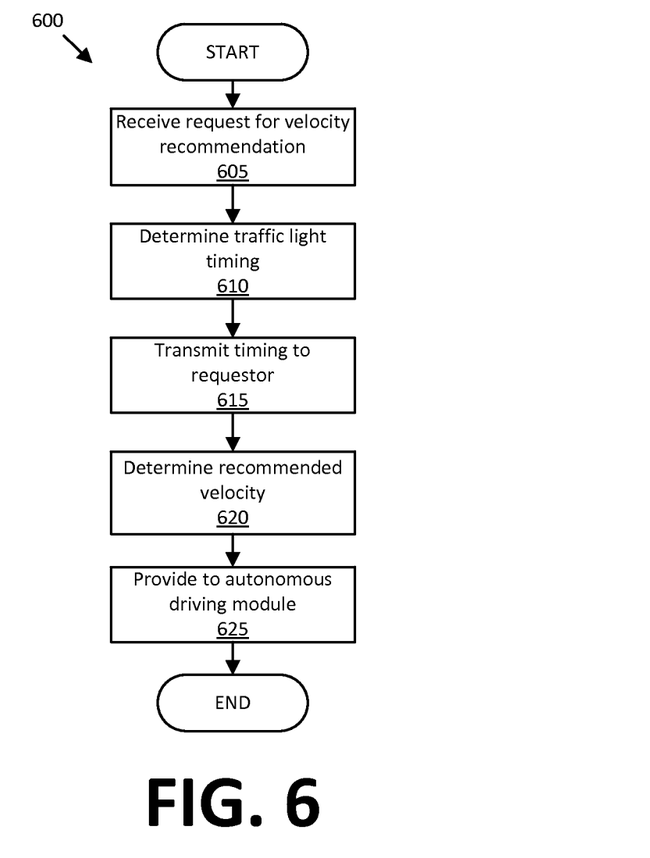
FIG. 6 is a diagram of an exemplary process for providing a velocity recommendation to a vehicle and/or vehicle operator.

FIG. 6 is a diagram of an exemplary process 600 for providing a velocity recommendation to a vehicle 101 and/or vehicle 101 operator.

The process 600 begins in a block 605, in which the server 125 receives a request for a velocity recommendation for the vehicle 101 from a computing device 105 or a user device 150. The request as made with respect to the process 600, in addition to identifying the vehicle 101 and/or its location, generally also will identify a planned route of the vehicle 101. Alternatively or additionally, the request may specify a geographic area of interest for the request, or a geographic area of interest may be determined by the server 125 according to the vehicle 101 location. As explained above, the vehicle 101 location may be specified in a request and/or may be determined from image data 140. Further, a request is not required for the server 125 to determine traffic signal timing; for example, the server 125 could analyze an image 140 to determine timing information, which could then be provided in response to a request received after the timing information was generated.

In general, the velocity recommendation may relate to timing of traffic signals, e.g., lights, on a route being traversed by the vehicle 101. By adjusting the velocity of the vehicle 101, the vehicle 101 can time it's travel so as to go through intersections or other areas regulated by traffic lights at a time when a light applicable to the vehicle 101 is green, and to thereby avoid stopping and braking because a traffic light is yellow or red.

Next, in a block 610, the server 125 analyzes image data 140 relating to a present location of the vehicle 101 and/or a planned route of the vehicle 101 and/or a geographic area of interest, e.g., a particular road on which the vehicle 101 is traveling, to determine times when traffic signals are likely to cause the vehicle 101 to brake or stop, e.g., times when traffic signals, e.g., lights on the vehicle 101 route, in a geographic area being analyzed, etc., are likely to be yellow or red. For example, the server 125 could analyze traffic patterns near traffic lights on the vehicle 101 route to determine times when traffic is slowed, stopped, and moving. The server 125 could also take into account historical traffic patterns near a traffic signal, e.g., showing what traffic signal timing is typically set for at various times of day, days of week, times of year, etc. Alternatively or additionally, the server 125 could take into account stored data about the traffic signal, e.g., timing of a green/yellow/red light cycle, etc. Further in addition to image data 140, the server 125 could take into account other data such as signals, e.g., from a GPS device, cellular phone, etc., transmitted by one or more vehicles 101 driving through or past the traffic signal. By combining image data 140 with one or more of the foregoing, the server 125 may provide a traffic signal timing prediction with a greater confidence level than would otherwise be possible.

Note that, in some cases, the server 125 may have a vehicle 101 location and heading, e.g., heading north on Main Street from the intersection of Main Street with Elm Street, but not have any information concerning a planned route of the vehicle 101. In such cases, the server 125 may analyze image data 140 for a set of traffic signals for a predicted route of the vehicle 101, e.g., a predetermined distance ahead on a projected path of the vehicle 101, e.g., a mile ahead, five miles ahead, etc. Further, if the vehicle 101 changes its heading, e.g., turns left from Main Street onto Chestnut Street and is now heading east on Chestnut Street, the server 125 could then analyze image data 140 for a new predicted route, e.g., a new set of traffic signals a predetermined distance ahead of a current vehicle 101 location based on a current vehicle 101 heading, e.g., signals within two miles to the east of the vehicle 101 on Chestnut Street.

Following the block 610, next, in a block 615, the server 125 transmits the timing information, e.g., a prediction of times when traffic lights on the vehicle 101 route are likely to be green, yellow, and/or red, to the computing device 105 or user device 150 responsible for the request described above with respect to the block 605.

Next, in a block 620, the requesting vehicle 101 computing device 105 or user device 150 determines a recommended velocity for the vehicle 101. The velocity recommendation may take into account road conditions, traffic regulations such as speed limits, etc., but also generally is based on the timing information related to traffic lights on the vehicle 101 route, e.g., the prediction of times when a light is lightly to be red, yellow, or green that may have been provided by the server 125. For example, by knowing when a traffic light at a given intersection is likely to be green, and by knowing a present vehicle 101 location, the computing device 105 or user device 150 could determine a desired velocity for the vehicle 101 to approach the intersection. Accordingly, the computing device 105 or 150 could determine a desired velocity for some or all of a vehicle 101 planned route.

Next, in a block 625, the recommended velocity determined in the block 620 may be provided to an autonomous driving module 106. The module 106 may then adjust the vehicle 101 velocity according to the recommendation. Following the block 625, the process 600 ends.

In some cases, an autonomous driving module 106 may not be present in a vehicle 101, or may not be in use. In such cases, the process 600 may omit the block 625, but a user could nonetheless be provided with recommended velocity information via an interface of a user device 150, an HMI associated with the computing device 105, etc. For example, the HMI could display information related to traffic light timing such as a velocity target, e.g., in miles or kilometers per hour), as an up-arrow indicating to increase velocity, a down-arrow to decrease velocity, or a flat line to maintain velocity, etc.

Further, as alluded to above concerning the block 620, the computing device 105, 150 may provide different velocity recommendations for different respective portions of a vehicle 101 route. For example, different portions of a route could be governed by different speed limits, road conditions, etc., but moreover a change in velocity may be desirable to accommodate traffic light timing information for different portions of a vehicle 101 route.

Moreover, in the exemplary process 600 above, velocity recommendations are determined by a device 105, 150 after receipt of timing information from the server 125. However, the server 125 could provide a velocity recommendation or recommendations for some or all portions of a vehicle 101 route, and could transmit such recommendation to a device 105 or 150.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said,"

etc. should be read to recite one or more of the indicated elements unless a claim recites an explicit limitation to the contrary.

The invention claimed is:

1. A system, comprising a computer server, the computer server including a processor and a memory, the memory storing instructions executable by the processor such that the server is configured to:

receive, from an image capture device mounted on an aircraft, an aerial image relating to a geographic area;

analyze the aerial image to identify at least one traffic signal in the geographic area, as well as times at which traffic at the signal is slowed, stopped, and moving; and based at least in part on the times determined for the aerial image at which the traffic is slowed, stopped, and moving, as well as stored data concerning the traffic signal, determine a prediction of at least one time at which the at least one traffic signal will change color.

2. The system of claim 1, wherein the server is further configured to transmit the prediction to a remote device associated with a vehicle.

3. The system of claim 2, wherein the remote device is configured to determine a recommended velocity for the vehicle based on the prediction.

4. The system of claim 3, wherein the remote device is further configured to provide the recommended velocity to an autonomous driving module.

5. The system of claim 1, wherein the server is further configured to:

determine a recommended velocity for a vehicle based on the prediction, and transmit the recommended velocity to a remote device associated with the vehicle.

6. The system of claim 1, wherein the geographic area is based on one of a planned route and a predicted route of a vehicle specified in a request for the prediction.

7. The system of claim 1, wherein the geographic area is based on a location the vehicle that is one of specified in a request for the prediction and determined from the aerial image.

8. The system of claim 1, wherein the server is further configured to determine the prediction based in part on stored data relating to the traffic signal.

9. The system of claim 8, wherein the stored data is at least one of timing information about the traffic signal and historical data relating to traffic flow through the traffic signal.

10. The system of claim 1, wherein the server is further configured to determine the prediction based in part on signals received from vehicles traveling past or through the traffic signal.

11. A method, comprising:

receiving, from an image capture device mounted on an aircraft, an aerial image relating to a geographic area;

analyzing the aerial image to identify at least one traffic signal in the geographic area, as well as times at which traffic at the signal is slowed, stopped, and moving; and based at least in part on the times determined for the aerial image at which the traffic is slowed, stopped, and moving, as well as stored data concerning the traffic signal, determining a prediction of at least one time at which the at least one traffic signal will change color.

12. The method of claim 11, further comprising transmitting the prediction to a remote device associated with a vehicle.

13. The method of claim 12, wherein the remote device is configured to determine a recommended velocity for the vehicle based on the prediction.

14. The method of claim 13, wherein the remote device is further configured to provide the recommended velocity to an autonomous driving module.

15. The method of claim 11, further comprising:

determining a recommended velocity for a vehicle based on the prediction, and transmitting the recommended velocity to a remote device associated with the vehicle.

16. The method of claim 11, wherein the geographic area is based on one of a planned route and a predicted route of a vehicle specified in a request for the prediction.

17. The method of claim 11, wherein the geographic area is based on a location the vehicle that is one of specified in a request for the timing prediction and determined from the aerial image.

18. The method of claim 11, further comprising determining the prediction based in part on stored data relating to the traffic signal.

19. The method of claim 18, wherein the stored data is at least one of information about the traffic signal and historical data relating to traffic flow through the traffic signal.

20. The method of claim 11, further comprising determining the prediction based in part on signals received from vehicles traveling past or through the traffic signal.

* * * * *